(12) United States Patent
Dijkstra

(10) Patent No.: US 12,528,752 B2
(45) Date of Patent: Jan. 20, 2026

(54) INTEGRATED AMMONIA AND SULFURIC ACID PRODUCTION PLANT AND PROCESS

(71) Applicant: CHEMETICS INC., Vancouver (CA)

(72) Inventor: Rene Dijkstra, North Vancouver (CA)

(73) Assignee: CHEMETICS INC., Vancouver (CA)

( * ) Notice: Subject to any disclaimer, the term of this patent is extended or adjusted under 35 U.S.C. 154(b) by 681 days.

(21) Appl. No.: 17/784,069

(22) PCT Filed: Dec. 13, 2019

(86) PCT No.: PCT/US2019/066262
§ 371 (c)(1),
(2) Date: Jun. 9, 2022

(87) PCT Pub. No.: WO2021/118599
PCT Pub. Date: Jun. 17, 2021

(65) Prior Publication Data
US 2023/0038918 A1     Feb. 9, 2023

(51) Int. Cl.
*C05G 1/00* (2006.01)
*B01D 53/14* (2006.01)
(Continued)

(52) U.S. Cl.
CPC .......... *C05G 1/00* (2013.01); *B01D 53/1481* (2013.01); *B01D 53/18* (2013.01); *B01J 8/065* (2013.01); *B01J 8/067* (2013.01); *B01J 19/2445* (2013.01); *B01J 19/245* (2013.01); *C01B 17/54* (2013.01); *C01B 17/7655* (2013.01);
(Continued)

(58) Field of Classification Search
CPC ...... C05G 1/00; B01D 53/1481; B01D 53/18; B01J 8/065; B01J 8/067; B01J 19/2445; B01J 19/245; C01B 17/54; C01B 17/7655; C01B 21/0433; C01C 1/0417; C02F 1/16;
(Continued)

(56) References Cited

U.S. PATENT DOCUMENTS 3,803,298 A * 4/1974 Guth ....................... H02K 5/203
                                                    423/532
3,865,922 A   2/1975 Boontje
(Continued)

FOREIGN PATENT DOCUMENTS

CA    3021202 A1 * 12/2018 ............. C01B 17/24
CN    1271298 A     10/2000
(Continued)

OTHER PUBLICATIONS

Thyssenkrupp Brochure, "Hydrogen from large-scale electrolysis", 5 pages.
(Continued)

*Primary Examiner* — Wayne A Langel
(74) *Attorney, Agent, or Firm* — Seed Intellectual Property Law Group LLP

(57) ABSTRACT

Integrated plants and associated processes for producing ammonia and sulfuric acid have been developed comprising air separation and water electrolysis subsystems and which make surprisingly efficient use of the products from these subsystems (i.e. oxygen and nitrogen from the former and hydrogen and oxygen from the latter). The invention is particularly suitable for use as part of an integrated fertilizer production plant.

16 Claims, 2 Drawing Sheets

(51) Int. Cl.
| | |
|---|---|
| *B01D 53/18* | (2006.01) |
| *B01J 8/06* | (2006.01) |
| *B01J 19/24* | (2006.01) |
| *C01B 17/54* | (2006.01) |
| *C01B 17/765* | (2006.01) |
| *C01B 21/04* | (2006.01) |
| *C01C 1/04* | (2006.01) |
| *C02F 1/16* | (2023.01) |
| *C05B 11/08* | (2006.01) |
| *C05C 3/00* | (2006.01) |
| *F25J 3/04* | (2006.01) |
| *C02F 103/08* | (2006.01) |

(52) U.S. Cl.
CPC ........ *C01B 21/0433* (2013.01); *C01C 1/0417* (2013.01); *C02F 1/16* (2013.01); *C05B 11/08* (2013.01); *C05C 3/00* (2013.01); *F25J 3/04527* (2013.01); *F25J 3/04587* (2013.01); *B01D 2252/103* (2013.01); *C01B 2210/0009* (2013.01); *C01B 2210/0045* (2013.01); *C02F 2103/08* (2013.01); *C02F 2303/10* (2013.01)

(58) Field of Classification Search
CPC ......... C05B 11/08; C05C 3/00; F25J 3/04527; F25J 3/04587
See application file for complete search history.

(56) References Cited

U.S. PATENT DOCUMENTS

| | | | | |
|---|---|---|---|---|
| 3,883,412 A | * | 5/1975 | Jensen | .................. C02F 1/4691 |
| | | | | 204/551 |
| 4,526,771 A | * | 7/1985 | Forbush | .................. C01B 17/54 |
| | | | | 423/539 |
| 4,966,757 A | * | 10/1990 | Lewis | ..................... C01B 17/54 |
| | | | | 422/111 |
| 5,204,082 A | * | 4/1993 | Schendel | ................ C01B 17/54 |
| | | | | 423/539 |
| 9,708,188 B1 | * | 7/2017 | Bhadra | ................ B01D 53/047 |
| 2008/0025910 A1 | | 1/2008 | O'Brien | |
| 2008/0216478 A1 | | 9/2008 | Cherry | |
| 2011/0318239 A1 | * | 12/2011 | Gong | ........................ C02F 1/50 |
| | | | | 422/187 |
| 2015/0291438 A1 | | 10/2015 | Merritt | |
| 2016/0297719 A1 | | 10/2016 | Takhim | |

FOREIGN PATENT DOCUMENTS

| | | | | |
|---|---|---|---|---|
| CN | 101001808 A | | 7/2007 | |
| CN | 103626136 A | | 3/2014 | |
| CN | 105939962 A | | 9/2016 | |
| CN | 107635915 A | | 1/2018 | |
| CN | 107881526 A | * | 4/2018 | ............. C25B 1/04 |
| EP | 200073 A | * | 12/1986 | ............ C05B 11/08 |
| EP | 2942323 A1 | | 11/2015 | |
| GB | 1504725 A | | 3/1978 | |
| WO | 99/10084 A1 | | 3/1999 | |
| WO | 2005/105666 A3 | | 11/2005 | |
| WO | 2008/052649 A1 | | 5/2008 | |
| WO | 2011/067042 A1 | | 6/2011 | |
| WO | 2015/015463 A1 | | 2/2015 | |
| WO | WO 2020/035521 A1 | * | 2/2020 | ............ C01B 21/26 |

OTHER PUBLICATIONS $SO_2$ and $SO_3$ Generation, "SOxClean: an alternative to burning sulphur in air", Sep.-Oct. 2013, Sulphur, vol. 348, pp. 1-3.

* cited by examiner

INTEGRATED AMMONIA AND SULFURIC ACID PRODUCTION PLANT AND PROCESS

TECHNICAL FIELD

The present invention pertains to plants and processes for producing ammonia and sulfuric acid. In particular, it pertains to plants and processes for producing these chemicals as feedstocks for fertilizer production plants.

BACKGROUND

Ammonia and sulfuric acid are two of the most produced commodity chemicals in the world and are widely used in the chemical industry and commercial products. Given the scope of production and the need to reduce global carbon footprint and energy consumption, great effort is being made to improve the production efficiency of these chemicals and to reduce any environmental impact associated with their production.

In the case of ammonia, production is typically accomplished using the Haber-Bosch process in which supplies of nitrogen and hydrogen are catalytically reacted together to form ammonia. The nitrogen is typically obtained by cryogenic air separation. The hydrogen commonly has been obtained by steam reforming hydrocarbons (e.g. natural gas) into gaseous hydrogen. In an effort to reduce the carbon oxides (greenhouse gases) produced from these and other methods, large scale water electrolysis is increasingly being employed to generate the required hydrogen. Electrolysis essentially results only in the production of hydrogen and oxygen gases and thus is highly desirable in reducing greenhouse gases. The by-product oxygen gas from either the cryogenic air separation or the electrolysis is relatively pure oxygen but is typically discharged to atmosphere as an uneconomical by-product.

In the case of sulfuric acid, production generally involves converting sulfur dioxide first to sulfur trioxide which is then later converted to sulfuric acid. Most of today's supply of sulfuric acid is produced using the contact process which involves obtaining a supply of sulfur dioxide (e.g. commonly obtained by burning sulfur with ambient air as the oxygen source) and then oxidizing the sulfur dioxide with oxygen from ambient air in the presence of a catalyst (typically vanadium pentoxide) to accelerate the reaction in order to produce sulfur trioxide. The reaction is reversible and exothermic and it is important to appropriately control the temperature of the gases over the catalyst to avoid damaging the catalyst and in order to achieve the desired conversion without damaging the contact apparatus which contains the catalyst.

The produced sulfur trioxide is then absorbed into a concentrated sulfuric acid solution to form a more concentrated sulfuric acid solution, which is then diluted to produce the desired concentrated sulfuric acid solution. This avoids the consequences of directly dissolving sulfur trioxide into water which is a highly exothermic reaction. The absorbing of the sulfur trioxide is usually done in one or more absorption towers.

Numerous varied processes and apparatus have been developed over the years for producing sulfuric acid in an improved manner and include improvements in the combustion of sulfur, in the production of sulfur trioxide from sulfur dioxide, in the absorption of sulfur trioxide in water, and so forth.

For instance, in WO2008/052649, a process is disclosed for the continuous catalytic complete or partial oxidation of a starting gas containing from 0.1 to 66% by volume of sulfur dioxide plus oxygen, in which the catalyst is kept active by means of pseudoisothermal process conditions with introduction or removal of energy. The related apparatus is characterized by at least one tube contact apparatus which is an upright heat exchanger composed of at least one double-walled tube whose catalyst-filled inner tube forms a reaction tube, with heat being transferred cocurrently around the reaction tube and an absorber for separating off $SO_3$ being installed downstream of the tube contact apparatus. The reactivity of the catalyst is preset by mixing with inert material. This process and apparatus are commercially available under the trade-mark CORE™. The advantages of this process compared to the conventional multi-pass adiabatic converter are the compact size and the high reaction rates and high conversion that can be achieved in a single pass as the process gas is cooled as it passes through the catalyst mass resulting in a significant reduced gas outlet temperature which is favorable for the $SO_3$ equilibrium.

In GB1504725, a process is disclosed for the continuous catalytic oxidation of a starting gas containing sulfur dioxide plus oxygen. The related apparatus is characterized by a contact apparatus that is a tubular heat exchanger comprising at least one single-walled tube whose catalyst-filled interior forms a reaction tube, characterized in that energy is introduced to the catalyst or is removed from the catalyst via an intermediate circuit in order to establish a temperature profile over the length of the reaction tube, at which the catalyst is kept active. Those skilled in the art will recognize that counter current flow and single walled tubular heat exchangers can also be used as long as appropriate precautions are included to ensure even distribution of the coolant medium outside the tubes.

In WO2011/067042, a process and apparatus are disclosed for combustion of at least one sulfur compound. The related apparatus is a staged combustion apparatus for producing sulfuric acid by a continuous process comprising the steps: (a) reacting elemental sulfur and/or sulfur compounds with an oxygen-containing combustion gas in a combustion unit to form sulfur dioxide, (b) catalytically oxidizing the sulfur dioxide from step (a) to form sulfur trioxide, (c) absorbing and/or condensing the sulfur trioxide from step (b) in sulfuric acid, wherein in step (a) the combustion gas is led through the combustion unit, which has at least two successive combustion zones in the direction of flow of the combustion gas, wherein in each combustion zone elemental sulfur and/or sulfur compounds is/are injected into the combustion gas, each combustion zone is cooled, and downstream from each combustion zone a heat exchanger is provided with which the reaction gas is cooled, so that the maximum temperature in each combustion zone does not exceed a value of 2000° C., characterized in that the maximum temperatures in the combustion zones decrease in the direction of the main gas stream. The apparatus comprises at least one combustion chamber for combustion of elemental sulfur and/or sulfur compounds, a tube contact apparatus for the catalytic oxidation of sulfur dioxide to sulfur trioxide, means for absorption and condensation of sulfur trioxide, means for offgas purification and means for recirculation of part of the gas stream which results after the absorption of the sulfur trioxide and contains unreacted amounts of oxygen and sulfur dioxide from the catalytic oxidation of sulfur dioxide to sulfur trioxide to the combustion chamber, in which the combustion chamber has a plurality of combustion zones which are separated from one another by means for removal of heat, characterized in that the tube contact apparatus forms only a single contact stage.

Both ammonia and sulfuric acid are commonly used as feedstocks in the production of international grade granular fertilizers, such as diammonium phosphate (DAP) and monoammonium phosphate (MAP) fertilizers. Typically, sulfuric acid is reacted with phosphate rock to produce phosphoric acid which itself is an important commodity chemical product. While the primary use of phosphoric acid is in the production of fertilizers, there are numerous additional applications for phosphoric acid. Phosphoric acid is commonly manufactured using what is known as the wet process method. In this method, an aqueous mixture is prepared which contains an appropriate ore comprising a substantial amount of tricalcium phosphate rock (e.g. by grinding the ore in an aqueous solution to produce an aqueous slurry, or merely combining ore as obtained with water, etc.). Sulfuric acid is added thereto which digests the rock and produces a solution comprising phosphoric acid and other species depending on what other minerals were present in the ore. Calcium sulfate precipitate is also produced and this precipitate is subsequently filtered and separated from the phosphoric acid solution. Depending on the grade (purity) of the phosphoric acid desired, additional process steps may then be required to remove unwanted elements and/or compounds. The produced phosphoric acid is then reacted with ammonia to produce DAP and/or MAP fertilizers in a fertilizer production plant. While the various feedstocks (ammonia, sulfuric acid, and/or phosphoric acid) may be prepared offsite and shipped to the fertilizer production plant as required, the feedstocks may also be prepared onsite with the fertilizer production plant and thus be integrated therewith.

The ever growing global need for phosphate based fertilizer has led to the existence of several large companies in the industry. These companies are located in areas with an abundance of phosphate rock allowing them to have large integrated fertilizer complexes that demand large volumes of sulfuric acid. This has led to ever larger sulfuric acid plants with outputs between 4000 and 5000 MTPD. As the plants have become larger, the economic and technical maximums are approached as the converters, absorbing towers and gas-gas exchangers involved are getting too large to be economically fabricated. The result is that multiple sulfuric acid plants are required to meet the downstream demand.

Commercial sulfur burning sulfuric acid plants have essentially always used ambient air as the source of the oxygen required in the process. The use of ambient air is inexpensive and the conventional process operating at approximately 12 vol % $SO_2$ into the converter perfectly balances the $O_2:SO_2$ ratio required for high conversion and the maximum allowable operating temperature in the first catalyst bed. The obvious disadvantage of using air is that each required molecule of oxygen also comes with approximately four molecules of inert gas (mainly $N_2$ and $CO_2$) which must also flow through the plant, therefore requiring very large equipment to handle to entire gas flow.

The use of oxygen as an alternative for some or all of the air has long been considered to combust sulfur to sulfur dioxide. Nonetheless, the use of oxygen in conventional commercial sulfuric acid plants was not warranted because the following process issues could not be overcome:

1) The burning of sulfur with oxygen or oxygen enriched air creates extremely high furnace temperatures which exceed the limits of available refractory materials.
2) When oxygen is used ideally an $O_2:SO_2$ ratio close to 0.5 should be used to minimize the oxygen cost. However, this results in $SO_2$ concentrations well above 60% which cannot be handled using vanadium catalyst in a conventional adiabatic converter because the resulting process gas temperature would exceed the upper temperature limit of the catalyst.

Submerged combustion is well known for various applications. For instance, an article titled "SOxClean: an alternative to burning sulfur in air", *Sulfur* 348 September-October 2013, discloses the $SO_2$ Clean™ process in which high purity sulfur dioxide is produced by burning sulfur using oxygen rather than air in a submerged combustion process, whereby cooling of the combustion apparatus is achieved by evaporation of part of the liquid sulfur. The various SOxClean™ processes were suggested for the production of sulfuric acid. The main disadvantage of the SOxClean™ process is the requirement to cool the combustion products to effectively condense all sulfur vapor from the $SO_2$ gas to prevent downstream blockages or process upsets.

Secondary combustion techniques for the combustion of sulfur to sulfur dioxide have also long been known to those skilled in the art; e.g. as disclosed in U.S. Pat. No. 3,803,298.

Recently, sulfuric acid production processes and plant designs were disclosed in Canadian patent application number 3,021,202 that had been developed to allow for production capacities in excess of 10,000 mtpd. CA3021202 is incorporated herein by reference in its entirety. In these plant designs, sulfur is combusted to sulfur dioxide using oxygen instead of air and submerged combustion was used to manage the heat which is generated. These designs offer lower capital expenditure as well as enhanced energy recovery. A relevant plant may be a single contact, single absorption sulfuric acid plant and the production process can specifically comprise the steps of: employing oxygen or oxygen enriched air for the combustion of sulfur to sulfur dioxide; employing submerged combustion for the combustion of sulfur to sulfur dioxide; employing a secondary combustion step after the submerged combustion for the combustion of residual sulfur to sulfur dioxide; employing oxygen or oxygen enriched air for the conversion of sulfur dioxide to sulfur trioxide; and converting sulfur dioxide to sulfur trioxide in a contact apparatus containing a conversion catalyst.

There exists a desire for improvements in plant design and their operation to efficiently and cost effectively produce volumes of ammonia and sulfuric acid, particularly for the production of fertilizer. The present invention addresses this desire and provides other benefits as disclosed below.

SUMMARY

An integrated plant and associated process has been developed for producing ammonia and sulfuric acid which includes air separation and water electrolysis subsystems and which makes surprisingly efficient use of the products from these subsystems. The efficient plant and process are particularly suitable for use as part of an integrated fertilizer production plant.

Specifically, an integrated plant of the invention for producing ammonia and sulfuric acid comprises an air separation subsystem, a water electrolysis subsystem, an ammonia production subsystem, and a sulfuric acid production subsystem. The air separation subsystem has an inlet for air and outlets for separated oxygen and separated nitrogen. The water electrolysis subsystem has an inlet for water and outlets for hydrogen from electrolysis and oxygen from electrolysis. The ammonia production subsystem has inlets for hydrogen and nitrogen and an outlet for ammonia in which the hydrogen outlet from the water electrolysis subsystem is fluidly connected to the hydrogen inlet of the ammonia production subsystem, and the nitrogen outlet from the air separation subsystem is fluidly connected to the nitrogen inlet of the ammonia production subsystem. The sulfuric acid production subsystem has inlets for sulfur, water and oxygen and an outlet for sulfuric acid in which the oxygen outlet from the air separation subsystem is fluidly connected to the oxygen inlet of the sulfuric acid production subsystem, and the oxygen outlet from the water electrolysis subsystem is fluidly connected to the oxygen inlet of the sulfuric acid production subsystem. It should be noted that, depending on the electrolysis technology used, the oxygen and hydrogen coming from the water electrolysis subsystem may be saturated with water vapor and hence part or all of the water may need to be removed before use in the acid and/or ammonia production subsystems.

In one embodiment, the air separation subsystem in the integrated plant can be a cryogenic air separation subsystem and the sulfuric acid production subsystem can be a submerged combustion sulfuric acid production subsystem. The submerged combustion sulfuric acid production subsystem typically comprises a submerged combustion chamber for the combustion of sulfur to sulfur dioxide, a secondary combustion chamber connected downstream of the submerged combustion chamber for the combustion of residual sulfur to sulfur dioxide, a contact apparatus downstream of the secondary combustion chamber for the conversion of sulfur dioxide to sulfur trioxide, and an absorption subsystem for absorbing sulfur trioxide in water.

In such an embodiment, the submerged combustion sulfuric acid production subsystem can be a single contact, single absorption sulfuric acid subsystem which is absent a main blower, a drying tower system, a reheat exchanger, and a secondary conversion and absorption system. A variety of designs of contact apparatus may be considered in such subsystems. For instance, the contact apparatus may be one that is an upright heat exchanger comprising at least one double-walled tube whose catalyst-filled interior tube forms a reaction tube, characterized in that energy is introduced to the catalyst or is removed from the catalyst via an intermediate circuit in order to establish a temperature profile over the length of the reaction tube, at which the catalyst is kept active. Also for instance, the contact apparatus may be one that is a tubular heat exchanger comprising at least one single-walled tube whose catalyst-filled interior forms a reaction tube, characterized in that energy is introduced to the catalyst or is removed from the catalyst via an intermediate circuit in order to establish a temperature profile over the length of the reaction tube, at which the catalyst is kept active.

In another embodiment, the sulfuric acid production subsystem can be a staged combustion apparatus comprising at least one combustion chamber for combustion of elemental sulfur and/or sulfur compounds, a tube contact apparatus for the catalytic oxidation of sulfur dioxide to sulfur trioxide, means for absorption and condensation of sulfur trioxide, means for offgas purification and means for recirculation of part of the gas stream which results after the absorption of the sulfur trioxide and contains unreacted amounts of oxygen and sulfur dioxide from the catalytic oxidation of sulfur dioxide to sulfur trioxide to the combustion chamber, in which the combustion chamber has a plurality of combustion zones which are separated from one another by means for removal of heat, characterized in that the tube contact apparatus forms only a single contact stage.

Where desired, the integrated plant may usefully comprise an optional water desalination subsystem with an inlet for seawater or brackish water and an outlet for fresh water in which the fresh water outlet from the water desalination subsystem is fluidly connected to the water inlet of the water electrolysis subsystem, and the fresh water outlet from the water desalination subsystem is fluidly connected to the water inlet of the sulfuric acid production subsystem. The desalination system is preferably operated using the energy released in the sulfuric acid plant during the absorption of $SO_3$ into sulfuric acid and captured in the form of hot water and/or steam. By-product energy released in the water electrolysis and/or the ammonia production subsystems can also be used to operate the desalination system.

The integrated plant and process are particularly suitable for providing ammonia and sulfuric acid feedstocks for use in a fertilizer production plant and can be readily integrated therein if desired. Such an integrated fertilizer production plant could comprise the aforementioned integrated plant for producing ammonia and sulfuric acid, a phosphoric acid production subsystem, and a fertilizer production subsystem. The phosphoric acid production subsystem has inlets for phosphate rock and sulfuric acid and an outlet for phosphoric acid in which the sulfuric acid outlet from the sulfuric acid production subsystem is fluidly connected to the sulfuric acid inlet of the phosphoric acid production subsystem. The fertilizer production subsystem has inlets for phosphoric acid and ammonia and at least one outlet for diammonium phosphate or monoammonium phosphate in which the ammonia outlet from the ammonia production subsystem is fluidly connected to the ammonia inlet of the fertilizer production subsystem, and the phosphoric acid outlet from the phosphoric acid production subsystem is fluidly connected to the phosphoric acid inlet of the fertilizer production subsystem.

An associated integrated process of the invention for the production of ammonia and sulfuric acid comprises the steps of:

obtaining the aforementioned integrated plant for the production of ammonia and sulfuric acid, separating oxygen and nitrogen from air supplied to the air separation subsystem, supplying the oxygen and the nitrogen obtained from the air separating step to the sulfuric acid production subsystem and to the ammonia production subsystem respectively, electrolyzing water supplied to the water electrolysis subsystem to produce hydrogen and oxygen from electrolysis, supplying the hydrogen and the oxygen produced in the electrolyzing water step to the ammonia production subsystem and the sulfuric acid production subsystem respectively, producing ammonia from the nitrogen and the hydrogen supplied to the ammonia production subsystem, and producing sulfuric acid from sulfur, water, and the oxygen supplied to the sulfuric acid production subsystem.

The integrated process of the invention makes efficient use of the oxygen produced in the air separating and water electrolyzing steps. In this regard, the ratio of the oxygen obtained from the air separating step and supplied to the sulfuric acid production subsystem to that of the oxygen produced in the electrolyzing water step and supplied to the sulfuric acid production subsystem may be in the range from about 0.25 to about 1.5. Further, the amounts produced are such that no other oxygen source may be required to supply the sulfuric acid production subsystem (i.e. the oxygen supplied to the sulfuric acid production subsystem may consist essentially of oxygen obtained from the air separating step and oxygen produced in the electrolyzing water step). Further, an integrated plant comprising an optional water desalination subsystem can also make effective use of waste heat for the water desalination.

In both the air separating and the electrolyzing water steps, the concentration of the oxygen obtained therefrom is typically greater than 90% by volume. The air separating step may also comprise the step of separating argon from air supplied to the air separation subsystem and outputting this argon as a useful by-product. Other commercial components of air, such as neon, helium, etc. can also be recovered from the tailgas, or the tailgas can be vented to atmosphere.

An associated integrated process of the invention for the production of diammonium phosphate and monoammonium phosphate fertilizers comprises the steps of:

obtaining the aforementioned integrated fertilizer production plant,
   separating oxygen and nitrogen from air supplied to the air separation subsystem,
   supplying the oxygen and the nitrogen obtained from the air separating step to the sulfuric acid production subsystem and to the ammonia production subsystem respectively,
   electrolyzing water supplied to the water electrolysis subsystem to produce hydrogen and oxygen from electrolysis,
   supplying the hydrogen and the oxygen produced in the electrolyzing water step to the ammonia production subsystem and the sulfuric acid production subsystem respectively,
   producing ammonia from the nitrogen and the hydrogen supplied to the ammonia production subsystem,
   supplying the ammonia produced in the producing ammonia step to the fertilizer production subsystem,
   producing sulfuric acid from sulfur, water, and the oxygen supplied to the sulfuric acid production subsystem,
   supplying the sulfuric acid produced in the producing sulfuric acid step to the phosphoric acid production subsystem,
   producing phosphoric acid from phosphate rock and the sulfuric acid supplied to the phosphoric acid production subsystem,
   supplying the phosphoric acid produced in the producing phosphoric acid step to the fertilizer production subsystem, and
   producing diammonium phosphate and monoammonium phosphate fertilizers from the phosphoric acid and the ammonia supplied to the fertilizer production subsystem.

In an embodiment comprising the aforementioned water desalination subsystem, the integrated process may further comprise: using a multiple effect distillation process in the water desalination subsystem to produce fresh water, producing energy in the form of hot water or steam during the step of producing sulfuric acid, and providing at least a portion of the produced energy to the water desalination subsystem as energy for the multiple effect distillation process. By-product energy rejected from the water electrolysis and ammonia production steps may also be used as energy for the multiple effect distillation process.

DETAILED DESCRIPTION

Unless the context requires otherwise, throughout this specification and claims, the words "comprise", "comprising" and the like are to be construed in an open, inclusive sense. The words "a", "an", and the like are to be considered as meaning at least one and are not limited to just one.

The phrase "consisting essentially of" is to be construed as limiting the item in question to those specified materials or steps but also to include those that do not materially affect the basic and novel characteristics of the item.

In a numerical context, the word "about" is to be construed as meaning plus or minus 10%.

The words "oxygen" or "pure oxygen" are to be considered as meaning oxygen in concentrations exceeding 90% by volume.

The trade-marks CORE-S™ and CORE-SO2™ refer to molten salt cooled tubular apparatus for the conversion of $SO_2$ to $SO_3$ and to the process for the production of sulfuric acid using pure oxygen utilizing submerged sulfur combustion and a CORE-S™ tubular apparatus respectively.

Integrated plants and processes for producing ammonia and sulfuric acid and also for the production of diammonium phosphate and monoammonium phosphate fertilizers therewith have been developed that allow for efficient use of the otherwise by-product oxygen coming from the subsystems used to supply nitrogen and hydrogen for ammonia production. The invention is particularly useful in the "green" production of fertilizer where the required hydrogen supply is generated by electrolysis using electric power generated using sustainable resources or generated using non-carbon dioxide emitting resources.

Figure 1:
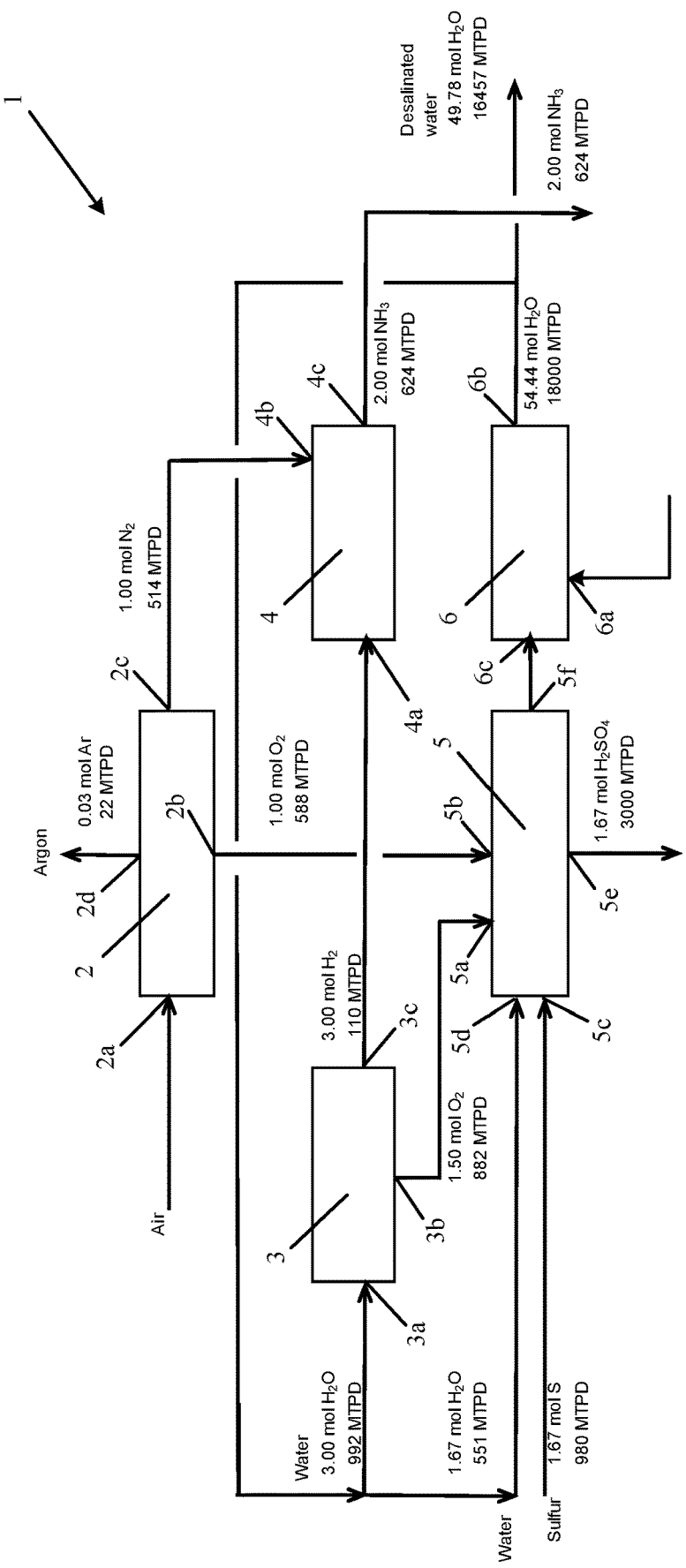
FIG. 1 shows a representative schematic of an integrated ammonia and sulfuric acid production plant of the invention.

FIG. 1 shows a schematic of an exemplary embodiment of an integrated plant of the invention for producing ammonia and sulfuric acid. Integrated plant 1 includes four major subsystems, namely air separation subsystem 2, water electrolysis subsystem 3, ammonia production subsystem 4, and sulfuric acid production subsystem 5. As shown, the exemplary integrated plant in FIG. 1 also includes optional water desalination subsystem 6.

Air is provided to air separation subsystem 2 at inlet 2a and is separated so as to provide at least supplies of oxygen (preferably pure oxygen) and nitrogen. In the embodiment of FIG. 1, air is separated so as to provide pure supplies of oxygen, nitrogen, and argon at outlets 2b, 2c, and 2d respectively. Air separation subsystem 2 may be based on various known air separation techniques. A preferred subsystem is a cryogenic air separation subsystem based on cryogenic separation techniques.

Water is provided to water electrolysis subsystem 3 at inlet 3a and is electrolyzed therein to provide supplies of relatively pure oxygen and hydrogen at outlets 3b and 3c respectively. Water electrolysis subsystem 3 may be based on any known electrolyzing designs and procedures.

Ammonia is produced in integrated plant 1 by ammonia production subsystem 4 which has inlets 4a and 4b for receiving the hydrogen and nitrogen provided from the water electrolysis and air separation subsystems respectively. Therefore in integrated plant 1, hydrogen outlet 3c from water electrolysis subsystem 3 is fluidly connected to hydrogen inlet 4a and nitrogen outlet 2c from air separation subsystem 2 is fluidly connected to nitrogen inlet 4b. The provided hydrogen and nitrogen are reacted together in ammonia production subsystem 4 and the ammonia produced is provided from outlet 4c. Ammonia production subsystem 4 may be based on any known design and process for producing ammonia. A preferred subsystem is a commercially preferred ammonia production subsystem employing the Haber-Bosch process.

Sulfuric acid is produced in integrated plant 1 by sulfuric acid production subsystem 5 which has inlets 5a and 5b for receiving the oxygen provided from both the water electrolysis and the air separation subsystems respectively. Therefore in integrated plant 1, oxygen outlet 2b from air separation subsystem 2 is fluidly connected to oxygen inlet 5b and oxygen outlet 3b from water electrolysis subsystem 3 is fluidly connected to oxygen inlet 5a. In addition, sulfuric acid production subsystem 5 requires supplies of sulfur and water which are provided at inlets 5c and 5d respectively. The sulfur, water, and oxygen are reacted together in sulfuric acid production subsystem 5 and the sulfuric acid produced is provided from outlet 5e. Also shown in FIG. 1 is hot water outlet 5f for hot water produced in sulfuric acid production subsystem 5 which may be gainfully used as an energy supply as desired elsewhere in a plant.

In a like manner to the other subsystems, sulfuric acid production subsystem 5 may be based on any known design and process for producing sulfuric acid.

A preferred sulfuric acid production subsystem is a submerged combustion sulfuric acid production subsystem, such as that disclosed in Canadian patent application number 3,021,202. Such a subsystem typically comprises a submerged combustion chamber for the combustion of sulfur to sulfur dioxide, a secondary combustion chamber connected downstream of the submerged combustion chamber for the combustion of residual sulfur to sulfur dioxide, a contact apparatus downstream of the secondary combustion chamber for the conversion of sulfur dioxide to sulfur trioxide, and an absorption subsystem for absorbing sulfur trioxide in water. Further, such a subsystem may desirably be a single contact, single absorption sulfuric acid subsystem (i.e. SCSA subsystem) which is absent a main blower, a drying tower system, a reheat exchanger, and a secondary conversion and absorption system. The contact apparatus in such a subsystem may be based on any known design and process for contact apparatus in the art. In particular though, the contact apparatus may include an upright heat exchanger comprising at least one double-walled tube whose catalyst-filled interior tube forms a reaction tube, characterized in that energy is introduced to the catalyst or is removed from the catalyst via an intermediate circuit in order to establish a temperature profile over the length of the reaction tube, at which the catalyst is kept active. Alternatively, the contact apparatus may include a tubular heat exchanger comprising at least one single-walled tube whose catalyst-filled interior forms a reaction tube, characterized in that energy is introduced to the catalyst or is removed from the catalyst via an intermediate circuit in order to establish a temperature profile over the length of the reaction tube, at which the catalyst is kept active.

An alternative sulfuric acid production subsystem for integrated plant 1 is a staged combustion apparatus. Such apparatus comprises at least one combustion chamber for combustion of elemental sulfur and/or sulfur compounds, a tube contact apparatus for the catalytic oxidation of sulfur dioxide to sulfur trioxide, means for absorption and condensation of sulfur trioxide, means for offgas purification and means for recirculation of part of the gas stream which results after the absorption of the sulfur trioxide and contains unreacted amounts of oxygen and sulfur dioxide from the catalytic oxidation of sulfur dioxide to sulfur trioxide to the combustion chamber, in which the combustion chamber has a plurality of combustion zones which are separated from one another by means for removal of heat, characterized in that the tube contact apparatus forms only a single contact stage.

In FIG. 1, integrated plant 1 comprises optional water desalination subsystem 6 which includes inlet 6a for seawater and outlet 6b for fresh desalinated water. Here, fresh water outlet 6b is fluidly connected to both water inlet 3a of water electrolysis subsystem 3 and to water inlet 5d of sulfuric acid production subsystem 5. Since a substantial amount of energy in the form of hot water is produced in sulfuric acid production subsystem 5, this hot water is shown as being supplied to water desalination subsystem 6 at inlet 6c to be gainfully used as an energy supply for water desalination subsystem 6.

Figure 2:
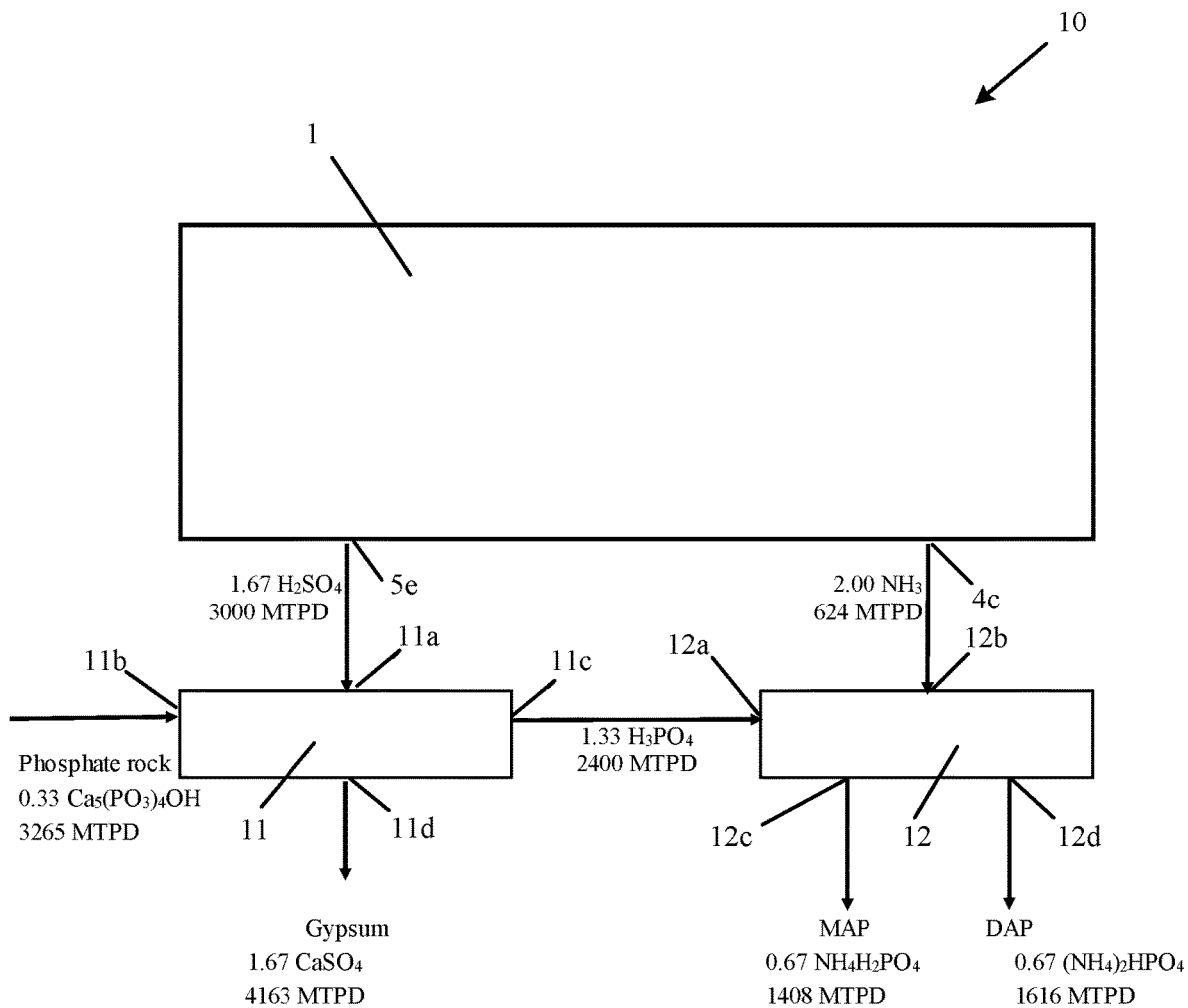
FIG. 2 shows a representative schematic of an integrated fertilizer production plant comprising the integrated ammonia and sulfuric acid production plant of FIG. 1.

The aforementioned integrated plant 1 produces ammonia and sulfuric acid in an efficient "green" manner especially when the power for the electrolysis subsystem is produced using natural resources like solar or wind and in relative quantities that are also particularly suitable for efficient use in fertilizer production. By-product electric power produced from the sulfuric acid plant is "green" and can be used to provide a significant portion of the power of the rest of the plant. FIG. 2 shows a representative schematic of an integrated fertilizer production plant 10 which incorporates integrated ammonia and sulfuric acid production plant 1 of FIG. 1. Along with integrated ammonia and sulfuric acid production plant 1, integrated fertilizer production plant 10 comprises phosphoric acid production subsystem 11 and fertilizer production subsystem 12.

Phosphoric acid is produced in phosphoric acid production subsystem 11 which has inlets 11a and 11b for receiving the sulfuric acid produced in the sulfuric acid production subsystem and a supply of phosphate rock respectively. Therefore in integrated fertilizer production plant 10, sulfuric acid outlet 5e from sulfuric acid production subsystem 5 is fluidly connected to sulfuric acid inlet 11a. The provided sulfuric acid and phosphate rock (crushed typically) are reacted together in phosphoric acid production subsystem 11 and the phosphoric acid produced is provided from outlet 11c. Phosphoric acid production subsystem 11 may be based on any known design and process for producing phosphoric acid. Preferably however, subsystem 11 is based on the wet process method. A by-product of the wet process method is gypsum which is shown as being removed from phosphoric acid production subsystem 11 in FIG. 2 at outlet 11d.

Finally, fertilizer is produced in fertilizer production subsystem 12 which has inlets 12a and 12b for receiving the phosphoric acid and the ammonia produced in phosphoric acid production subsystem 11 and ammonia production subsystem 4 respectively. Therefore in integrated fertilizer production plant 10, ammonia outlet 4c from ammonia production subsystem 4 is fluidly connected to ammonia inlet 12b and phosphoric acid outlet 11c from phosphoric acid production subsystem 11 is fluidly connected to phosphoric acid inlet 12a. As shown in FIG. 2, the provided ammonia and phosphoric acid are reacted together in fertilizer production subsystem 12 to produce both monoammonium phosphate (MAP) and diammonium phosphate (DAP) which are delivered from outputs 12c and 12d respectively.

As mentioned, an important advantage of the present invention is that integrated plant 1 efficiently produces ammonia and sulfuric acid in a green manner and in relative quantities that are quite suitable for efficient use in fertilizer production. Integrated plant 1 may be located separate from the fertilizer production plant or plants that its supplies. Advantageously however, integrated plant 1 is itself incorporated into an integrated fertilizer production plant as shown in FIGS. 1 and 2. Further, FIGS. 1 and 2 show exemplary amounts of the chemicals supplied to and those produced in both integrated plant 1 and in integrated fertilizer production plant 10. Shown are relative amounts of these chemicals in moles and also in metric tons per day (MTPD). These amounts were obtained from modelling of a commercial-scale integrated fertilizer production plant in accordance with the invention. (Additional details are given in the Example section following.) In this regard, the typical product ratios obtained from actual present-day cryogenic air separation subsystems are provided for the nitrogen, oxygen, and argon produced (and are obviously not the ratios existing in the supplied air).

In the operation of integrated plant 1, oxygen and nitrogen are separated from air supplied to air separation subsystem 2. The oxygen and the nitrogen obtained from the air separating step are supplied to sulfuric acid production subsystem 5 and to ammonia production subsystem 4 respectively. Water supplied to water electrolysis subsystem 3 is electrolyzed to produce hydrogen and oxygen which are then supplied to ammonia production subsystem 4 and sulfuric acid production subsystem 5 respectively. Ammonia is produced from the nitrogen and the hydrogen supplied to ammonia production subsystem 4, and sulfuric acid is produced from sulfur, water, and the oxygen supplied to sulfuric acid production subsystem 5. Typically, the ratio of the oxygen obtained from the air separating step and supplied to sulfuric acid production subsystem 5 to that of the oxygen produced in the electrolyzing water step and supplied to sulfuric acid production subsystem 5 is in the range from about 0.25 to about 1.5. Typically, the oxygen obtained from the air separating step and produced in the electrolyzing water step is relatively pure (e.g. concentrations greater than 90% by volume). And advantageously, no additional oxygen may be required for sulfuric acid production (i.e. the oxygen supplied to the sulfuric acid production subsystem consists essentially of the oxygen obtained from the air separating and the electrolyzing water steps).

In embodiments in which the sulfuric acid production subsystem is a submerged combustion sulfuric acid production subsystem, ratios of oxygen to sulfur dioxide in the production of sulfuric acid are desirably less than 1, preferably from about 0.4 to 0.8, and more preferably from about 0.45 to 0.55. Further, the concentration of sulfur dioxide entering the contact apparatus is desirably greater than 15 vol %, preferably greater than 30 vol %, and most preferably greater than 45%.

In the operation of integrated fertilizer production plant 10, ammonia and sulfuric acid are initially produced in integrated plant 1. The ammonia is supplied directly to fertilizer production subsystem 12. The sulfuric acid is supplied to phosphoric acid production subsystem 11 in which phosphoric acid is produced from this acid and phosphate rock. The phosphoric acid produced is then supplied to fertilizer production subsystem 12 in which both DAP and MAP are produced.

As shown in FIG. 1 and therefore 2, integrated fertilizer production plant 10 also comprises an optional water desalination subsystem. Here, a multiple effect distillation process, such as that disclosed in "Steam or water, the choice is easy . . . ", R. Dijkstra *Sulphur* 2016, $32^{nd}$ International Conference & Exhibition, London 7-10 Nov. 2016 may desirably be used to produce fresh water. The required energy for this multiple effect distillation process may be produced in the form of hot water or steam during the step of producing sulfuric acid.

As is evident from the exemplary chemical amounts supplied to and produced in the embodiment of FIGS. 1 and 2, the present invention provides for a very efficient, "green" integrated fertilizer production plant. Further, embodiments of the invention can take full advantage of the benefits of using pure oxygen instead of air in the production of sulfuric acid. For instance, these benefits include:

A major problem of high temperatures during the combustion of sulfur in pure oxygen is solved by using a submerged combustion system where the oxygen is sparged into molten sulfur.

Pure oxygen reduces the gas volume involved and hence the plant equipment size by more than 70%.

A main blower is not required since oxygen is received under pressure, thereby saving power.

A drying tower system is eliminated since the supplied oxygen contains no moisture.

Low temperature submerged combustion allows for all-metal construction of the equipment or alternatively the use of cost effective thin refractory linings.

High conversion is achieved in a single pass in a molten salt cooled, submerged combustion sulfuric acid production subsystem.

In a single absorption design, no reheat exchangers nor secondary absorption system are required.

Enhanced energy recovery is obtained thereby producing more hot water and/or steam which can be used to meet many of the energy requirements of the subsystems involved.

$SO_2$ emissions below 10 ppm are easily achieved. In addition, because the purge stream emitted to atmosphere can be extremely small (~1000 $Nm^3/hr$), the total mass of $SO_2$ or acid mist emissions from the plant can be virtually zero.

The air separation subsystem can also produce argon as a valuable by-product that can be sold into the local market for additional revenue streams.

Low operating expenditure.

The following Example has been included to illustrate certain aspects of the invention but should not be construed as limiting in any way.

Example

Modelling was done on a representative commercial scale integrated fertilizer production plant that was designed and configured in accordance with the invention. Specifically, the commercial scale plant was arranged as shown in FIGS. 1 and 2 above. The air separation subsystem was assumed to be a typical commercial cryogenic air separation subsystem that produces gaseous nitrogen and gaseous oxygen in a 1:1 ratio (known as a GAN:GOX ratio of 1:1). The water electrolysis subsystem was assumed to be a typical commercially available electrolysis system (e.g. Alkaline Water Electrolysis, Proton Exchange Membrane or Solid state electrolysis system). The ammonia production subsystem was assumed to of a typical commercial type operating on the Haber-Bosch method. For illustrative purposes, the sulfuric acid production subsystem was assumed to be a submerged combustion sulfuric acid production subsystem, and specifically a commercial CORE-SO2™ sulfuric acid subsystem with 3,000 MTPD (metric tons per day) capacity (a single contact, single absorption sulfuric acid subsystem which is absent a main blower, a drying tower system, a reheat exchanger, and a secondary conversion and absorption system). It was also assumed that an optional water desalination subsystem based on a multiple effect distillation process was included in the plant. In this desalination subsystem, it was assumed that 6 kg of water was produced in the desalination subsystem per kg of acid produced in the acid producing subsystem. Further, the phosphoric acid production subsystem was assumed to be of a typical commercial type operating on the wet process method. Finally, the fertilizer production subsystem was also assumed to be a typical commercial type producing both MAP and DAP fertilizers.

Based on the preceding, the amounts of the input chemicals and the output chemicals produced were calculated and appear in both FIGS. 1 and 2 in metric tons per day (MTPD). The relative amounts in moles of these chemicals also are provided in FIGS. 1 and 2. For instance, 588 and 514 MTPD of essentially pure oxygen and nitrogen were determined to be produced by the air separation subsystem. Again, because the air separation subsystem operates with a GAN/GOX ratio of 1:1, the relative moles of oxygen and nitrogen produced are both 1. As shown, the relative number of moles of sulfur being provided to the sulfuric acid production subsystem is 1.67. The total relative number of moles of oxygen being provided to the sulfuric acid production subsystem is 2.5 (i.e. 1 mole from the air separation subsystem and 1.5 moles from the water electrolysis subsystem). The relative number of moles of nitrogen and hydrogen being provided to the ammonia acid production subsystem are 3 and 1 respectively from the air separation subsystem and the water electrolysis subsystem respectively. Ultimately, the relative number of moles of MAP and DAP fertilizer produced in the fertilizer production subsystem are both 0.67.

As is evident from this modelling, an integrated fertilizer production plant of the invention is expected to make highly efficient use of the chemical products from its component subsystems. Further, it will be clear to those skilled in the art that while the preceding example and quantities are based on a relatively large sized integrated fertilizer production plant (and thus comprising a sulfuric acid production subsystem with large capacity), similar designs and processes may be employed for smaller or larger plants with similar economic benefits obtained. The invention therefore has applicability for any plant capacity.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The invention claimed is:

1. An integrated plant for producing ammonia and sulfuric acid comprising:
an air separation subsystem with an inlet for air and outlets for separated oxygen at a concentration greater than 90% by volume and separated nitrogen;
a water electrolysis subsystem with an inlet for water and outlets for hydrogen from electrolysis and oxygen at a concentration greater than 90% by volume from electrolysis;
an ammonia production subsystem with inlets for hydrogen and nitrogen and an outlet for ammonia wherein:
the hydrogen outlet from the water electrolysis subsystem is fluidly connected to the hydrogen inlet of the ammonia production subsystem; and
the nitrogen outlet from the air separation subsystem is fluidly connected to the nitrogen inlet of the ammonia production subsystem; and
a sulfuric acid production subsystem with inlets consisting of an inlet for sulfur, an inlet for water, an inlet for oxygen fluidly connected to the oxygen outlet from the air separation subsystem, and an inlet for oxygen fluidly connected to the oxygen outlet from the water electrolysis subsystem; and an outlet for sulfuric acid, wherein the inlets for oxygen receive oxygen at a concentration greater than 90% by volume, and wherein:
the oxygen outlet from the air separation subsystem is fluidly connected to the oxygen inlet of the sulfuric acid production subsystem; and
the oxygen outlet from the water electrolysis subsystem is fluidly connected to the oxygen inlet of the sulfuric acid production subsystem.

2. The integrated plant of claim 1 wherein the sulfuric acid production subsystem is a submerged combustion sulfuric acid production subsystem comprising:
a submerged combustion chamber for the combustion of sulfur to sulfur dioxide;
a secondary combustion chamber connected downstream of the submerged combustion chamber for the combustion of residual sulfur to sulfur dioxide;
a contact apparatus downstream of the secondary combustion chamber for the conversion of sulfur dioxide to sulfur trioxide; and
an absorption subsystem for absorbing sulfur trioxide in water.

3. The integrated plant of claim 2 wherein the submerged combustion sulfuric acid production subsystem is a single contact, single absorption sulfuric acid subsystem and is absent a main blower, a drying tower system, a reheat exchanger, and a secondary conversion and absorption system.

4. The integrated plant of claim 3 wherein the contact apparatus in the submerged combustion sulfuric acid production subsystem is a contact apparatus that is an upright heat exchanger comprising at least one double-walled tube whose catalyst-filled interior tube forms a reaction tube.

5. The integrated plant of claim 3 wherein the contact apparatus in the submerged combustion sulfuric acid production subsystem is a contact apparatus that is a tubular heat exchanger comprising at least one single-walled tube whose catalyst-filled interior forms a reaction tube.

6. The integrated plant of claim 1 wherein the air separation subsystem is a cryogenic air separation subsystem.

7. The integrated plant of claim 1 wherein the sulfuric acid production subsystem is a staged combustion apparatus for producing sulfuric acid by a continuous process comprising at least one combustion chamber for combustion of elemental sulfur and/or sulfur compounds, a tube contact apparatus for the catalytic oxidation of sulfur dioxide to sulfur trioxide, means for absorption and condensation of sulfur trioxide, means for offgas purification and means for recirculation of part of the gas stream which results after the absorption of the sulfur trioxide and contains unreacted amounts of oxygen and sulfur dioxide from the catalytic oxidation of sulfur dioxide to sulfur trioxide to the combustion chamber, wherein the combustion chamber has a plurality of combustion zones which are separated from one another by means for removal of heat, characterized in that the tube contact apparatus forms only a single contact stage.

8. The integrated plant of claim 1 comprising a water desalination subsystem with an inlet for seawater and an outlet for fresh water wherein:
the fresh water outlet from the water desalination subsystem is fluidly connected to the water inlet of the water electrolysis subsystem; and
the fresh water outlet from the water desalination subsystem is fluidly connected to the water inlet of the sulfuric acid production subsystem.

9. An integrated fertilizer production plant comprising:
the integrated plant for producing ammonia and sulfuric acid of claim 1;
a phosphoric acid production subsystem with inlets for phosphate rock and sulfuric acid and an outlet for phosphoric acid wherein:
the sulfuric acid outlet from the sulfuric acid production subsystem is fluidly connected to the sulfuric acid inlet of the phosphoric acid production subsystem;
a fertilizer production subsystem with inlets for phosphoric acid and ammonia and at least one outlet for diammonium phosphate or monoammonium phosphate wherein:
the ammonia outlet from the ammonia production subsystem is fluidly connected to the ammonia inlet of the fertilizer production subsystem; and
the phosphoric acid outlet from the phosphoric acid production subsystem is fluidly connected to the phosphoric acid inlet of the fertilizer production subsystem.

10. An integrated process for the production of diammonium phosphate and monoammonium phosphate fertilizers comprising the steps of:
obtaining the integrated fertilizer production plant of claim 9;
separating oxygen and nitrogen from air supplied to the air separation subsystem;
supplying the oxygen and the nitrogen obtained from the air separating step to the sulfuric acid production subsystem and to the ammonia production subsystem, respectively, wherein the oxygen supplied to the sulfuric acid production subsystem from the air separation subsystem is at a concentration greater than 90% by volume;
electrolyzing water supplied to the water electrolysis subsystem to produce hydrogen and oxygen from electrolysis;
supplying the hydrogen and the oxygen produced in the electrolyzing water step to the ammonia production subsystem and the sulfuric acid production subsystem, respectively, wherein the oxygen supplied to the sulfuric acid production subsystem produced in the electrolyzing water step is at a concentration greater than 90% by volume;
producing ammonia from the nitrogen and the hydrogen supplied to the ammonia production subsystem;
supplying the ammonia produced in the producing ammonia step to the fertilizer production subsystem;
producing sulfuric acid from sulfur, water, and the oxygen supplied to the sulfuric acid production subsystem;
supplying the sulfuric acid produced in the producing sulfuric acid step to the phosphoric acid production subsystem;
producing phosphoric acid from phosphate rock and the sulfuric acid supplied to the phosphoric acid production subsystem;
supplying the phosphoric acid produced in the producing phosphoric acid step to the fertilizer production subsystem; and
producing diammonium phosphate and monoammonium phosphate fertilizers from the phosphoric acid and the ammonia supplied to the fertilizer production subsystem.

11. The integrated process of claim 10 wherein the integrated fertilizer production plant comprises a water desalination subsystem with an inlet for seawater and an outlet for fresh water wherein the fresh water outlet from the water desalination subsystem is fluidly connected to the water inlet of the water electrolysis subsystem, and the fresh water outlet from the water desalination subsystem is fluidly connected to the water inlet of the sulfuric acid production subsystem; the process comprising:
using a multiple effect distillation process in the water desalination subsystem to produce fresh water;
producing energy in the form of hot water or steam during the step of producing sulfuric acid; and
providing at least a portion of the produced energy to the water desalination subsystem as energy for the multiple effect distillation process.

12. An integrated process for the production of ammonia and sulfuric acid comprising the steps of:
obtaining the integrated plant of claim 1;
separating oxygen and nitrogen from air supplied to the air separation subsystem;
supplying the oxygen and the nitrogen obtained from the air separating step to the sulfuric acid production subsystem and to the ammonia production subsystem, respectively, wherein the oxygen supplied to the sulfuric acid production subsystem from the air separation step is at a concentration greater than 90% by volume;
electrolyzing water supplied to the water electrolysis subsystem to produce hydrogen and oxygen from electrolysis;
supplying the hydrogen and the oxygen produced in the electrolyzing water step to the ammonia production subsystem and the sulfuric acid production subsystem, respectively, wherein the oxygen supplied to the sulfuric acid production subsystem produced in the electrolyzing water step is at a concentration greater than 90% by volume;
producing ammonia from the nitrogen and the hydrogen supplied to the ammonia production subsystem; and
producing sulfuric acid from sulfur, water, and the oxygen supplied to the sulfuric acid production subsystem,
wherein the concentration of the oxygen obtained from the air separating step and of the oxygen produced in the electrolyzing water step is greater than 90% by volume.

13. The integrated process of claim 12 wherein the ratio of the oxygen obtained from the air separating step and supplied to the sulfuric acid production subsystem to that of the oxygen produced in the electrolyzing water step and supplied to the sulfuric acid production subsystem is in the range from about 0.25 to about 1.5.

14. The integrated process of claim 13 wherein the oxygen supplied to the sulfuric acid production subsystem consists essentially of oxygen obtained from the air separating step and oxygen produced in the electrolyzing water step.

15. The integrated process of claim 12 wherein the air separating step comprises separating argon from air supplied to the air separation subsystem and the integrated process comprises outputting the argon obtained from the air separating step.

16. The integrated process of claim 12 wherein the sulfuric acid production subsystem is a submerged combustion sulfuric acid production subsystem.

* * * * *